United States Patent
Berhorst et al.

(10) Patent No.: US 12,517,542 B2
(45) Date of Patent: Jan. 6, 2026

(54) VEHICLE PEDAL FOR A MOTOR VEHICLE, METHOD FOR OPERATING A VEHICLE PEDAL FOR A MOTOR VEHICLE, MOTOR VEHICLE

(71) Applicant: HELLA GmbH & Co. KGaA, Lippstadt (DE)

(72) Inventors: Jann Berhorst, Borchen (DE); Sascha Kuhlmann, Geseke (DE); Clemens Massmann, Wadersloh (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/408,408

(22) Filed: Jan. 9, 2024

(65) Prior Publication Data

US 2024/0231411 A1    Jul. 11, 2024

(30) Foreign Application Priority Data

Jan. 9, 2023 (DE) .................. 10 2023 100 323.2
Mar. 27, 2023 (DE) .................. 10 2023 107 615.9

(51) Int. Cl.
| | |
|---|---|
| G05G 1/38 | (2008.04) |
| G05G 1/44 | (2008.04) |
| G05G 5/05 | (2006.01) |
| G05G 5/26 | (2006.01) |

(52) U.S. Cl.
CPC ............... *G05G 1/38* (2013.01); *G05G 1/44* (2013.01); *G05G 5/05* (2013.01); *G05G 5/26* (2013.01); *G05G 2505/00* (2013.01)

(58) Field of Classification Search
CPC ....................................................... G05G 5/26
See application file for complete search history.

(56) References Cited

U.S. PATENT DOCUMENTS

| | | | |
|---|---|---|---|
| 5,416,295 A | 5/1995 | White et al. | |
| 5,794,489 A | 8/1998 | Papenhagen et al. | |

FOREIGN PATENT DOCUMENTS

| | | | | |
|---|---|---|---|---|
| CN | 201573543 U | | 9/2010 | |
| CN | 102029905 A | | 4/2011 | |
| CN | 114008556 A | * | 2/2022 | ............. B60T 7/042 |
| DE | 19531732 A1 | * | 3/1997 | ............. B60K 26/02 |
| KR | 1020100094778 | | 8/2010 | |

* cited by examiner

*Primary Examiner* — Vicky A Johnson
(74) *Attorney, Agent, or Firm* — Muncy, Geissler, Olds & Lowe, P.C.

(57) ABSTRACT

A vehicle pedal for a motor vehicle that includes a base plate, which may be attached to the body of the motor vehicle, a pedal plate, which is configured to absorb a mechanical force from a driver and which is pivotable relative to the base plate, and at least one hinge via which the base plate and the pedal plate are coupled with each other in a pivoting manner. The vehicle pedal also includes a spring unit, which is coupled with the pedal plate and extends in parallel or essentially in parallel to the pedal plate, and a lever unit, which is coupled with the spring unit and includes a lever arm and a sensor. The mechanical force may be transferred to the sensor of the lever unit via the spring unit and the lever arm of the lever unit. The sensor converts the mechanical force into electrical force.

18 Claims, 2 Drawing Sheets

VEHICLE PEDAL FOR A MOTOR VEHICLE, METHOD FOR OPERATING A VEHICLE PEDAL FOR A MOTOR VEHICLE, MOTOR VEHICLE

This nonprovisional application claims priority under 35 U.S.C. § 119(a) to German Patent Application No. 102023107615.9 which was filed in Germany on Mar. 27, 2023, and German Patent Application No. 102023100323.2 which was filed in Germany on Jan. 9, 2023, and which are herein incorporated by reference.

BACKGROUND OF THE INVENTION

Field of the Invention

The invention generally relates to the field of motor vehicles in the areas of agriculture and construction. The invention specifically relates to a vehicle pedal for a motor vehicle, a method for operating a vehicle pedal for a motor vehicle, as well as a motor vehicle.

Description of the Background Art

Vehicle pedals, such as gas pedals, have high requirements relating to reliability. After all, a vehicle pedal basically represents the connection between the human and the machine, or the motor vehicle. A vehicle pedal must be able to be actuated precisely, transmit a signal reliably, in particular a control signal, and have little susceptibility to errors.

These requirements are difficult to meet, particularly in the areas of agriculture and construction. In these areas, the driver's cab may be extremely dirty and/or dusty. As a result, the entire mechanical system of known vehicle pedals is often exposed to dirt and dust. It is also possible that gravel and/or stones may penetrate all the way to the vehicle pedal.

SUMMARY OF THE INVENTION

It is therefore an object of the present invention to advantageously meet the requirements described above. In particular, an object of the present invention is to increase the robustness and the reliability of the vehicle pedal. A further object of the present invention may be seen in providing a vehicle pedal which is less susceptible to contaminants compared to known vehicle pedals.

Features and details which are described in connection with the vehicle pedal according to the invention also apply, of course, in connection with the motor vehicle according to the invention and/or the method, and vice versa in each case, so that reference always is or may be made interchangeably with respect to the disclosure of the individual aspects of the invention.

An improved, robust, and reliable vehicle pedal may be advantageously provided with the aid of the invention. A vehicle pedal of this type is less susceptible to errors, in particular less susceptible to contaminants.

An aspect of the present disclosure relates to a vehicle pedal for a motor vehicle. The vehicle pedal includes a base plate, which may be attached to the body of the motor vehicle, a pedal plate, which is configured to absorb a mechanical force from a driver, and which is pivotable relative to the base plate. The vehicle pedal furthermore includes at least one hinge, via which the base plate and the pedal plate are coupled with each other in a pivoting manner, a spring unit, which is coupled with the pedal plate and extends in parallel or essentially in parallel to the pedal plate, and a lever unit coupled with the spring unit. The lever unit, in turn, includes a lever arm and a sensor. The mechanical force may be transferred to the sensor of the lever unit via the spring unit and the lever arm of the lever unit. The sensor is designed to convert the mechanical force into electrical force.

In other words, a vehicle pedal is provided, whose important mechanical components, i.e., the spring unit, are arranged beneath the pedal plate and not on the base plate, in contrast to known vehicle pedals. As a result, the spring unit, which generally includes all important mechanical components, may be less susceptible to contaminants.

The vehicle pedal may be a gas pedal, a brake pedal, or a control pedal. With the aid of a vehicle pedal of this type, a function of the motor vehicle may generally be controlled by means of a mechanical force of the driver of the motor vehicle. The motor vehicle may be any type of motor vehicle. It is preferably a motor vehicle which is customarily used in agriculture or in construction.

The proposed vehicle pedal may be made up of two units, which are pivotably arranged with respect to each other. On the one hand, the pedal plate, which is coupled with the spring unit, may represent a first unit and, on the other hand, the base plate, which is preferably coupled with the lever unit, may represent a second unit. The pedal plate and the base plate are preferably coupled with each other in a pivoting manner via one or multiple hinges. The spring unit and the lever unit may be movably coupled with each other via the lever arm of the lever unit. The lever units and the spring unit may be connected or operatively connected to each other in such a way that the mechanical force may be transferred from the pedal plate to the sensor. A pivoting of the pedal plate may therefore cause a movement of the spring unit, which, in turn, may cause a movement of the lever arm. As a result, the sensor of the lever unit may detect the movement, which is preferably a pivoting, of the lever arm.

The pedal plate of the vehicle pedal preferably has a longitudinal extension, which, as in the known vehicle pedals, may correspond to the longitudinal extension of a foot of the driver. The spring unit may therefore extend in parallel or essentially in parallel to the longitudinal extension of the pedal plate. The spring unit may thus be arranged at a certain angle above the base plate, the pivoting of the spring unit relative to the base plate corresponding to the pivoting of the pedal plate relative to the base plate.

A robust, cost-effective vehicle pedal may be provided thereby, which also has little susceptibility to errors due to dirt, gravel, and/or dust.

The pedal plate can include a coupling unit and/or a setting device. The coupling unit and/or the setting device is/are configured to couple the spring unit with the pedal plate, in particular to fasten it in a movable manner.

The coupling unit and/or the setting device may be bent parts. A portion of the pedal plate may be bent to form the coupling unit and/or the setting device. The coupling unit may be a cutout in the pedal plate, which has been bent in the direction of the base plate, preferably at a 90° angle to the pedal plate. The coupling unit may therefore form an opening in the pedal plate, due to the bending. The coupling unit preferably itself has an opening and/or a bore, through which the spring unit may be guided. In particular, a guide rod of the spring unit may be guided through the opening of the coupling unit. The opening of the coupling unit may be designed in such a way that the spring unit may be movably guided within the opening.

The setting device may be two cutouts in the pedal plate. The two cutouts for forming the setting device may be arranged symmetrically relative to the longitudinal axis of the pedal plate, i.e., relative to the axis in parallel to the longitudinal extension of the pedal plate. The two cutouts may be bent to the back side of the pedal plate in the direction of the longitudinal axis of the pedal plate. The bending angle of the setting device is preferably perpendicular to the bending angle of the coupling unit. The setting device also preferably has an opening, in particular one opening for each section. The opening may be arranged at a defined distance from the back side of the pedal plate. The back side of the pedal plate designates the side oriented in the direction of the base plate or to the body of the motor vehicle. The front side of the pedal plate designates the side which is indirectly or directly touched by the foot of the driver.

The spring unit can include at least one spring package, the at least one spring package being compressible for absorbing the mechanical force at a/the coupling device of the pedal plate. The spring package may be wound around a guide rod. The spring package may be arranged between a coupling unit and a spring seat. The spring seat is preferably arranged on the free end of the spring unit, i.e., at the free end of the pedal plate.

The spring unit can include an articulation piece, which is configured to couple the spring unit with the lever unit, in particular to receive the lever arm of the lever unit with the aid of a setting pin of the spring unit. The articulation piece may have a gap for receiving the lever arm of the lever unit. The articulation piece may furthermore have a bore oriented transversely to the receptacle for receiving a setting pin. The setting pin may extend through the bores of the articulation piece as well as through the lever arm. The extension of the setting pin may be oriented essentially perpendicularly to the extension of the lever arm.

An operative coupling of the articulation piece, i.e. the spring unit, with the lever arm, i.e. the lever unit, may be advantageously achieved thereby. On the whole, it is advantageous if the opening of the articulation piece is designed to be form-fitting with an end piece of the lever arm, since the mechanical force may be transferred with less loss thereby. The bore of the articulation piece preferably has the same diameter as the outer diameter of the setting pin.

The articulation piece of the spring unit can have a friction surface, which is in contact with a back side of the pedal plate. The back side of the pedal plate may have a mating friction surface for this purpose. Due to the friction surface of the articulation piece, a friction force may be transferred to the pedal plate. A hysteresis effect may be generated by a vehicle pedal of this type. The vehicle pedal may therefore be held in a setpoint position or target position without a great application of force.

In particular, a hysteresis effect may be generated if no more mechanical force is being absorbed by the pedal plate and the pivot angle of the pedal plate is enlarged or is to be enlarged. The articulation piece may be designed to be form-fitting with the back side of the pedal plate, in particular with the mating friction surface of the pedal plate.

The friction surface or the articulation piece and/or the mating friction surface of the back side of the pedal plate may be determined and/or set via the setting device. The setting device may be arranged in such a way that the distance between the back side of the pedal plate and the articulation piece of the spring unit may be permanently defined or set. During a pivoting of the pedal plate, the articulation piece may be rubbed along its friction surface.

The setting device may guide the articulation piece along the friction surface with the aid of the setting pin. For this purpose, it may be provided that the setting pin is arranged in a guide slot of the setting device, in particular arranged in a movable manner.

The pedal plate and/or the base plate comprise(s) sheet metal, in particular can be made from sheet metal.

This makes it possible to further increase the robustness of the vehicle pedal.

The lever arm of the lever unit can be bent and coupled with the sensor of the lever unit, forming a variable setting angle. The transfer of the mechanical force with the aid of the lever arm may be carried out more precisely thereby. This makes it possible to better translate, in particular, the pivot angle of the pedal plate into a setting angle of the lever arm in relation to the sensor. The lever arm may be bent at an angle of 40°, 30°, or 20°. The bending of the lever arm is preferably permanently defined. The lever arm is preferably designed as a single part.

The sensor of the lever unit can be a rotation angle sensor, which is configured to ascertain a/the setting angle of the lever arm of the lever unit. The setting angle of the lever arm correlates, in particular, to the mechanical force and/or to a pivot angle of the pedal plate. In other words, the setting angle is preferably associated with the pivot angle of the pedal plate. The ratio of the setting angle of the lever arm to the pivot angle of the pedal plate may depend on the bending of the lever arm.

A pedal protector can be provided, which is configured to cover at least a front side of the pedal plate. The pedal protector may be designed as a single part. The pedal protector may be designed to be connectable to the pedal plate in an exchangeable manner. The pedal protector may be alternatively or additionally made from plastic or include plastic.

A second aspect of the present disclosure relates to a method for operating a vehicle pedal for a motor vehicle, as described above and below. The method includes the following steps: absorbing a mechanical force with the aid of a pedal plate via a pivoting of the pedal plate relative to the base plate; and transferring the mechanical force to the sensor of the lever unit via the spring unit and the lever arm of the lever unit. The transferred mechanical force is converted into electrical force with the aid of the sensor.

All advantages which have been explained in reference to the first aspect of the present disclosure likewise apply to the method for operating a vehicle pedal according to the second aspect of the present disclosure.

A spring package of the spring unit can be compressed by the pivoting of the pedal plate relative to the base plate for the purpose of transferring the mechanical force to the sensor, and a movement of an articulation piece of the spring unit running in parallel or running essentially in parallel to a longitudinal extension of the pedal plate is caused by the compression.

In other words, the articulation piece may move back and forth in parallel or essentially in parallel to the longitudinal extension of the spring unit and/or the pedal plate by a pivoting of the pedal plate, which causes a compression of the spring package (regardless of whether the pivot angle is made smaller or larger). During the movement of the articulation piece, the articulation piece is preferably in continuous contact with the back side of the pedal plate. The spring package may be compressible between a coupling unit and a spring seat.

The movement of the articulation piece running can be parallel or essentially in parallel to the longitudinal extension of the pedal plate for the purpose of transferring the mechanical force to the sensor implies a pivoting of the lever arm of the lever unit relative to the sensor of the lever unit. In addition, the corresponding pivot angle of the pivoting of the lever arm is ascertained with the aid of the sensor. The sensor may therefore be a rotation angle sensor.

The mechanical force may be advantageously converted into electrical force thereby.

During the absorption of the mechanical force with the aid of the pedal plate, an articulation piece of the spring unit can be rubbed on the pedal plate, in particular on a back side of the pedal plate, in such a way that the articulation piece effectuates a counter-force against the relaxation of the spring package of the spring unit.

A further aspect of the present disclosure relates to a motor vehicle, in particular for the agriculture area and/or the construction area, including a vehicle pedal, as described above and below.

All disclosures which are described above and below in reference to one aspect of the present disclosure likewise apply to all further aspects of the present disclosure.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
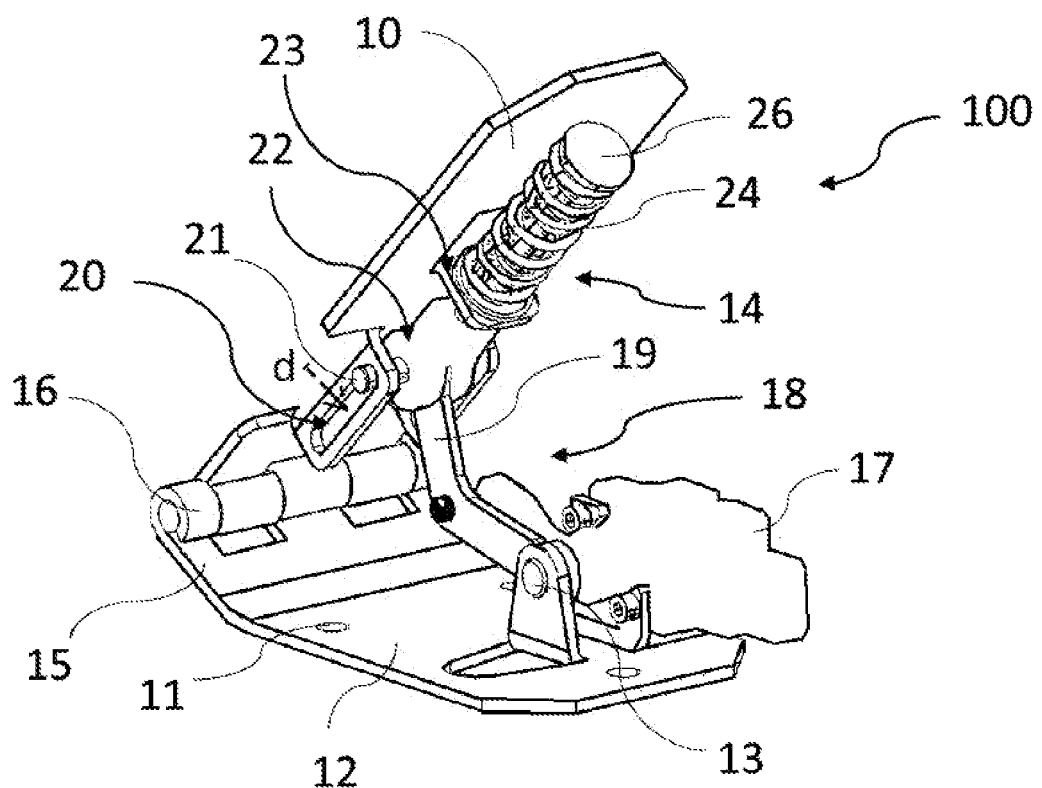
FIG. 1 shows a perspective view of a vehicle pedal according to an example.

FIG. 1 shows a perspective view of a vehicle pedal according to an example. Vehicle pedal 100, which is preferably a gas pedal, includes a base plate 12, which may be attached to the body of the motor vehicle, and a pedal plate 10, which is configured to absorb a mechanical force from a driver, and which is pivotable relative to base plate 12. The two plates, i.e., pedal plate 10 and base plate 12, are preferably made from sheet metal. They may also be sheet metal parts, which are each designed as a single piece. Alternatively, for example, pedal plate 10 may be designed as a single piece and base plate 12 as multiple pieces or vice versa. Vehicle pedal 100 also includes at least one hinge 16, via which base plate 12 and pedal plate 10 are coupled with each other in a pivoting manner. Base plate 12 may have a raised region 15. Raised region 15 may be used to situate at least one hinge 16 at a distance from the body of the motor vehicle. Raised region 15 of base plate 12 may alternatively or additionally advantageously relieve the load of the at least one hinge 16, since pivot angle $\alpha$ of pedal plate 10 relative to base plate 12 is, in fact, larger than the actual pivot angle of the at least one hinge 16, due to raised region 15 of base plate 12.

Vehicle pedal 100 also includes a spring unit 14, which is coupled with pedal plate 10, in particular via a coupling device 23 and a setting unit 20. Spring unit 14 extends in parallel or essentially in parallel to pedal plate 10, in particular to the longitudinal extension of pedal plate 10. Spring unit 14 may include a guide rod, around which at least one spring package 24 is arranged. The guide rod may pass through an opening of coupling device 23. The guide rod may also include a spring seat 26. The guide rod and spring seat 26 may be designed as a single part. Spring unit 14 furthermore includes an articulation piece 22. The guide rod may open into articulation piece 22. Articulation piece 22 may be, for example, a cast part, made, for example, from plastic or metal. Articulation piece 22 may therefore be cast on the free end of the guide rod. Spring package 24 of spring unit 14 may be arranged around the guide rod, spring package 24 being arranged between spring seat 26 and coupling device 23. Coupling device 23 may form an abutment surface or a contact surface for spring package 24.

Vehicle pedal 100 includes a lever unit 18. Lever unit 18, in turn, includes a lever arm 19 and a sensor 17. Lever unit 18 and spring unit 14 are connected to each other, in particular operatively connected to each other. Articulation piece 22 may receive lever arm 19 of lever unit 18 to connect the two units. For this purpose, articulation piece 22 may have a gap, which is preferably form-fitting with lever arm 19. The end of lever arm 19, which is received in articulation piece 22, is provided with a bore. Setting pin 21 may pass through the bore of lever arm 19.

Articulation piece 22 may be coupled with pedal plate 10 via a setting pin 21 and a setting unit 20. Setting pin 21 passes through articulation piece 22 transversely to the longitudinal axis of spring unit 14 in such a way that lever arm 19 is received by setting pin 21 in articulation piece 22, in particular in a gap of articulation piece 22.

The end of lever arm 19 opposite the mating piece is coupled with sensor 17 of lever unit 18, in particular coupled via a sensor joint 13. Sensor 17 of lever unit 18 is preferably fastened on base plate 12 of vehicle pedal 100. For this purpose, a bent part of base plate 12 may be provided to form sensor joint 13. Sensor 17 is designed to convert the mechanical force absorbed by pedal plate 10 into electrical force. The mechanical force is absorbed by pedal plate 10 and transferred to sensor 17 via spring unit 14, in particular spring package 24 of spring unit 14, by the pivoting of pedal plate 10 around a pivot angle $\alpha$ relative to base plate 12, and lever arm 19. A pivoting around a pivot angle $\alpha$ of pedal plate 10 in the direction of base plate 12 of vehicle pedal 100 implies a compression of spring package 24 of spring unit 14. Articulation piece 22 is also moved, in particular along the longitudinal extension of pedal plate 10. Articulation piece 22 may follow a predefined movement along the longitudinal extension of pedal plate 10 with the aid of the setting pin. For this purpose, setting pin 21 may protrude into one or two guide slots of setting device 20 in such a way that setting device 20 predefines distance d between the back side of pedal plate 10 and articulation piece 22.

Distance d, which may be predefined or set by setting device 20, may be set in such a way that articulation piece 22 and pedal plate 10 are in continuous contact (i.e., even when the vehicle pedal is actuated). Articulation piece 22 may therefore have a friction surface. The size of the friction surface of articulation piece 22 may depend on distance d, i.e., on the setting device 20. When a mechanical force is applied to pedal plate 10, articulation piece 22 will move in such a way that setting pin 21 moves in guide slot(s) in parallel or essentially in parallel to the longitudinal extension of pedal plate 10 and/or the spring unit.

Sensor 17 may be a rotation angle sensor. The rotation angle sensor may ascertain a setting angle β of lever arm 19 of lever unit 18. Setting angle β represents the angle of lever arm 19 relative to base plate 12 of vehicle pedal 100 at the connecting point between lever arm 19 and sensor 17 (cf. FIG. 2).

Base plate 12 of vehicle pedal 100 may also have one or multiple fastening holes 11. The base plate may be fastened directly or indirectly to the body of the motor vehicle with the aid of a fastening hole 11 of this type.

On the whole, the example in FIG. 1 may have the advantage that both articulation piece 22 and spring package 24 are situated outside the dirty area and are thus less susceptible to errors.

Figure 2:
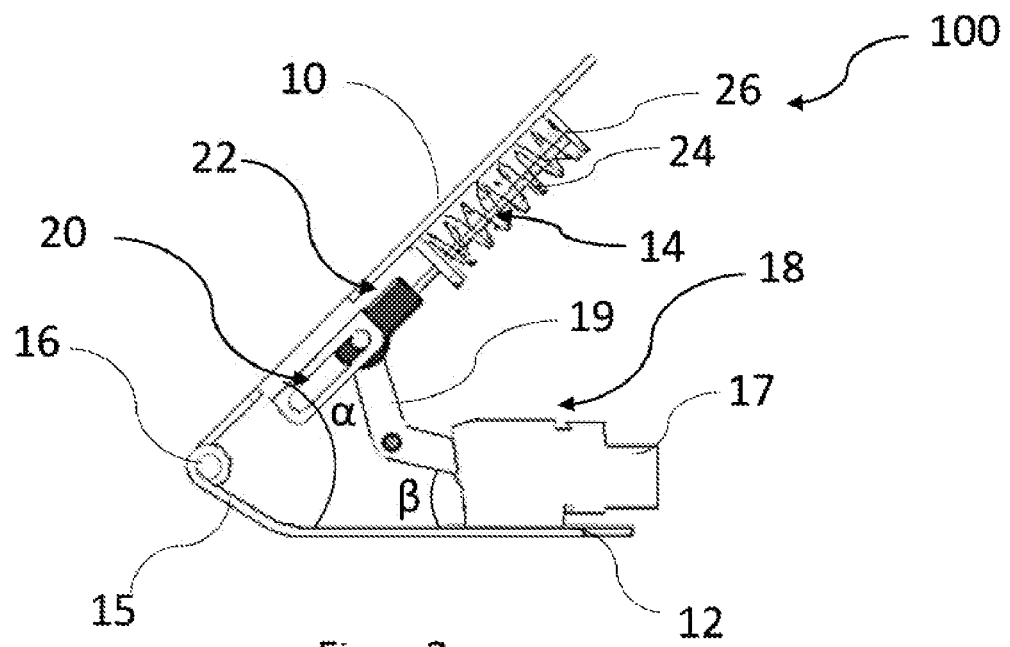
FIG. 2 shows a side view of a vehicle pedal according to an example.

FIG. 2 shows a side view of a vehicle pedal 100 according to an examplet. Unless otherwise described, vehicle pedal 100 in FIG. 2 includes substantially the same elements and/or components as vehicle pedal 100 in FIG. 1. FIG. 2 shows, in particular, vehicle pedal 100 in an idle state or in a detensioned state. It is apparent in FIG. 2, namely, that the at least one spring package 24 of spring unit 14 is detensioned. Vehicle pedal 100 may be in the idle state or in the detensioned state when no mechanical force is currently being applied to pedal plate 10.

Figure 3:
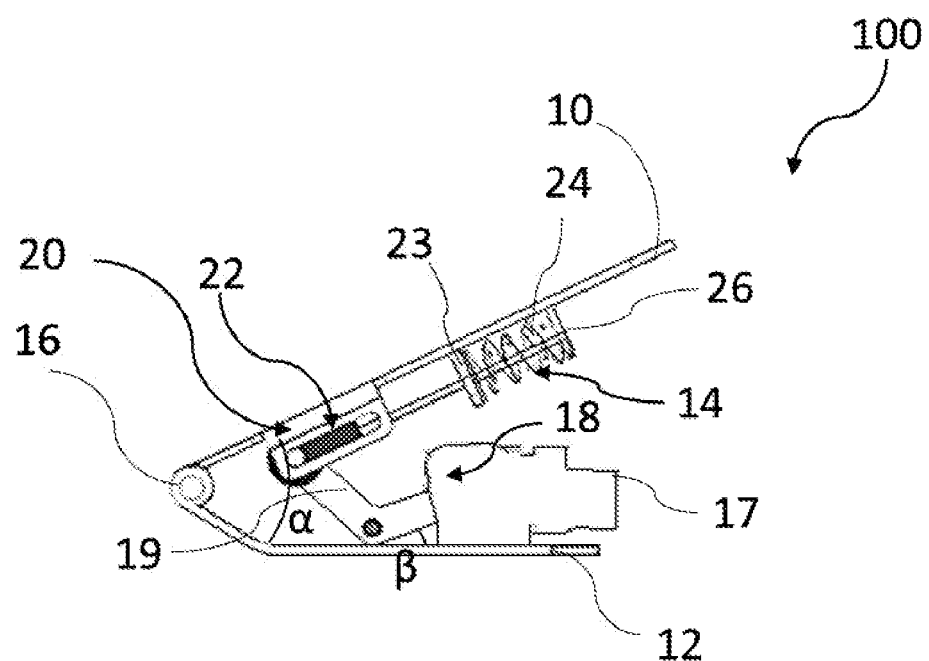
FIG. 3 shows a side view of a vehicle pedal according to an example.

FIG. 3 shows a side view of a vehicle pedal 100 according to an example. Unless otherwise described, vehicle pedal 100 in FIG. 3 includes substantially the same elements and/or components as vehicle pedal 100 in FIGS. 1 and 2. In FIG. 3, vehicle pedal 100 is shown in an actuated state. This is apparent in that spring package 24 of spring unit 14 is compressed between spring seat 26 and coupling unit 23, or it is more compressed than in FIG. 2. As a result, articulation piece 22 of spring unit 14 was moved in parallel or essentially in parallel to the longitudinal extension of pedal plate 10 in the direction of the at least one hinge 16. The movement of articulation piece 22 may be guided with the aid of setting device 20, in particular with the aid of the guide slots of setting device 20. Setting device 20 preferably includes two bent parts of pedal plate 10, each of which is provided with a guide slot of this type for a setting pin 21. A transition from the actuated state to the idle state of vehicle pedal 100 or vice versa may therefore correspond to a compression or relaxation (or detensioning) of spring package 24 and to a movement of articulation piece 22 running in parallel or essentially in parallel to the longitudinal extension of the pedal plate. Pivot angle α of pedal plate 10 relative to base plate 12 grows smaller starting from the idle state of vehicle pedal 100 to the actuated state of vehicle pedal 100. The reduction in size of pivot angle α correlates to a reduction in size of setting angle β of lever arm 19 relative to sensor 17. To implement or to clarify this correlation, lever arm 19 is preferably bent, in particular bent at an angle of 30°, 40°, or 50°.

Articulation piece 22 may apply a counterforce against the detensioning or relaxation of spring package 24 starting from the actuated state of vehicle pedal 100 to the idle state of vehicle pedal 100. In other words, a hysteresis effect may be generated. Articulation piece 22 has a friction surface for this purpose. When the mechanical force is absorbed with the aid of pedal plate 10, articulation piece 22 of spring unit 14 is rubbed against pedal plate 10, in particular against the back side of pedal plate 10, in such a way that articulation piece 22 effectuates a counter-force against the relaxation of spring package 24 of the spring unit.

In summary, a predefined friction takes effect in a setpoint position upon the actuation of the vehicle pedal, so that the corresponding pedal position may be held in position without a great application of force.

Figure 4:
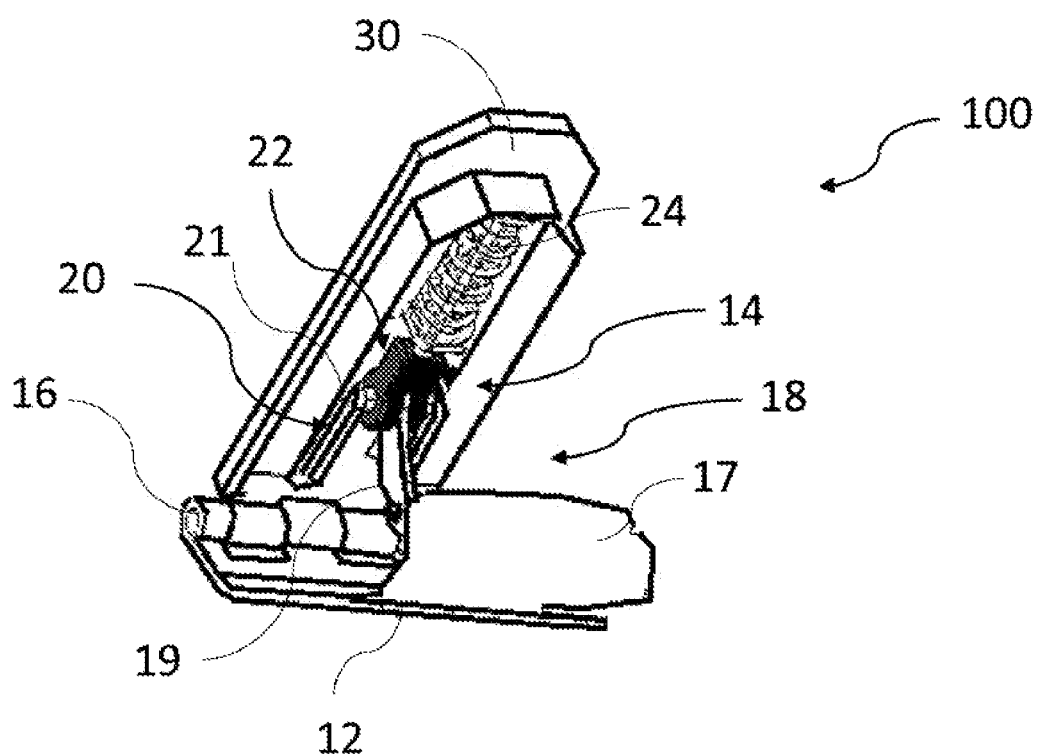
FIG. 4 shows a perspective view of a vehicle pedal according to an example.

FIG. 4 shows a perspective view of a vehicle pedal 100 according to an example. Unless otherwise described, vehicle pedal 100 in FIG. 4 includes substantially the same elements and/or components as vehicle pedal 100 in FIGS. 1 through 3.

Vehicle pedal 100 in FIG. 4 also includes a pedal protector 30. Pedal protector 30 is configured to cover at least a front side of pedal plate 10. Pedal protector 30 may also be configured to protect the important mechanical components of the vehicle pedal, i.e., spring unit 14, at least in sections. Pedal protector 30 may shield or protect spring unit 14 from the sides. Petal protector 30 preferably comprises plastic. Pedal protector 30 may be used to improve the haptics of the pedal plate for the driver. Pedal protector 30 may also be used to make vehicle pedal 100 less susceptible to dirt, dust, or the like.

Pedal protector 30 may be connectable to pedal plate 10 in an exchangeable manner. In particular, pedal protector 30 may be slipped onto or on the pedal plate.

It should additionally be noted that the terms "comprising" and "including" do not exclude any other elements, and the indefinite article "a" or "an" does not exclude a plurality. Furthermore, it should be noted that features and steps which were described with reference to one of the above exemplary embodiments may also be used in combination with other features and steps of other exemplary embodiments described above. Reference numerals in the claims are not to be considered as limitations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle pedal for a motor vehicle, the vehicle pedal comprising:
    a base plate attachable to the body of the motor vehicle;
    a pedal plate configured to absorb a mechanical force from a driver and which is pivotable relative to the base plate;
    at least one hinge, via which the base plate and the pedal plate are coupled with each other in a pivoting manner;
    a spring unit coupled with the pedal plate, the spring unit extending in parallel to the pedal plate; and
    a lever unit coupled with the spring unit, the lever unit having a lever arm and a sensor,
    wherein a mechanical force is transferable to the sensor of the lever unit via the spring unit and the lever arm of the lever unit, and
    wherein the sensor converts the mechanical force into electrical force.

2. The vehicle pedal according to claim 1, wherein the pedal plate includes a coupling unit and/or a setting device, the coupling unit and/or the setting device being configured to couple or movably fasten the spring unit to the pedal plate.

3. The vehicle pedal according to claim 1, wherein the spring unit includes at least one spring package, the at least one spring package being compressible for the purpose of absorbing the mechanical force on the coupling device of the pedal plate.

4. The vehicle pedal according to claim 1, wherein the spring unit includes an articulation piece, which is configured to couple the spring unit with the lever unit or to receive the lever arm of the lever unit, with the aid of a setting pin of the spring unit.

5. The vehicle pedal according to claim 1, wherein the pedal plate and/or the base plate comprises sheet metal or is made from sheet metal.

6. The vehicle pedal according to claim 1, wherein the sensor of the lever unit is a rotation angle sensor, which is configured to ascertain a setting angle of the lever arm of the lever unit, the setting angle of the lever arm correlating to the mechanical force and/or to a pivot angle of the pedal plate.

7. The vehicle pedal according to claim 1, further comprising a pedal protector that is configured to cover at least a front side of the pedal plate.

8. A method for operating a vehicle pedal according to claim 1, the method comprising:
absorbing a mechanical force with the aid of the pedal plate via a pivoting of the pedal plate relative to the base plate;
transferring the mechanical force to the sensor of the lever unit via the spring unit and the lever arm of the lever unit;
converting the transferred mechanical force into electrical force via the sensor.

9. The method according to claim 8, wherein a spring package of the spring unit is compressed by the pivoting of the pedal plate relative to the base plate for transferring the mechanical force to the sensor, and a movement of an articulation piece of the spring unit running in parallel or running essentially in parallel to a longitudinal extension of the pedal plate is caused by the compression.

10. The method according to claim 9, wherein, for the purpose of transferring the mechanical force to the sensor, a pivoting of the lever arm of the lever unit relative to the sensor of the lever unit is provided by the movement of the articulation piece in parallel or essentially in parallel to the longitudinal extension of the pedal plate, and the corresponding pivot angle of the pivoting of the lever arm is ascertained by the sensor.

11. The method according to claim 8, wherein, when the mechanical force is absorbed with the aid of the pedal plate, an articulation piece of the spring unit is rubbed against the pedal plate or against a back side of the pedal plate such that the articulation piece effectuates a counter-force against the relaxation of the spring package of the spring unit.

12. A motor vehicle for an agriculture area and/or the construction area, comprising a vehicle pedal according to claim 1.

13. The vehicle pedal according to claim 1, wherein a plane along which the pedal plate extends is parallel or essentially parallel to a longitudinal axis of a guide rod of the spring unit.

14. The vehicle pedal according to claim 1, wherein the spring unit includes an articulation piece which is configured to couple the spring unit with the lever unit, wherein a first end of the lever arm of the lever unit is received in the articulation piece, and a second end of the lever arm of the lever unit is coupled to the sensor of the lever unit.

15. The vehicle pedal according to claim 1, wherein the spring unit includes an articulation piece which is configured to couple the spring unit with the lever unit, wherein a first end of the lever arm of the lever unit is received in the articulation piece, wherein a setting pin of the spring unit passes through a bore of the articulation piece and a bore provided in the first end of the lever arm, such that the articulation piece couples the spring unit with the lever unit.

16. The vehicle pedal according to claim 1, wherein the pedal plate includes a coupling unit that couples the spring unit to the pedal plate, the coupling unit having an opening through which a guide rod of the spring unit extends.

17. A vehicle pedal for a motor vehicle, the vehicle pedal comprising:
a base plate attachable to the body of the motor vehicle;
a pedal plate configured to absorb a mechanical force from a driver and which is pivotable relative to the base plate;
at least one hinge, via which the base plate and the pedal plate are coupled with each other in a pivoting manner;
a spring unit coupled with the pedal plate, the spring unit extending in parallel or essentially in parallel to the pedal plate; and
a lever unit coupled with the spring unit, the lever unit having a lever arm and a sensor,
wherein a mechanical force is transferable to the sensor of the lever unit via the spring unit and the lever arm of the lever unit,
wherein the sensor converts the mechanical force into electrical force,
wherein the spring unit includes an articulation piece, which is configured to couple the spring unit with the lever unit or to receive the lever arm of the lever unit, with the aid of a setting pin of the spring unit, and
wherein the articulation piece of the spring unit has a friction surface, which is in contact with a back side of the pedal plate.

18. A vehicle pedal for a motor vehicle, the vehicle pedal comprising:
a base plate attachable to the body of the motor vehicle;
a pedal plate configured to absorb a mechanical force from a driver and which is pivotable relative to the base plate;
at least one hinge, via which the base plate and the pedal plate are coupled with each other in a pivoting manner;
a spring unit coupled with the pedal plate, the spring unit extending in parallel or essentially in parallel to the pedal plate; and
a lever unit coupled with the spring unit, the lever unit having a lever arm and a sensor,
wherein a mechanical force is transferable to the sensor of the lever unit via the spring unit and the lever arm of the lever unit,
wherein the sensor converts the mechanical force into electrical force, and
wherein the lever arm of the lever unit is bent and coupled with the sensor of the lever unit to form a variable setting angle.

* * * * *